United States Patent
Pusuluri et al.

(10) Patent No.: US 11,961,402 B2
(45) Date of Patent: Apr. 16, 2024

(54) ANOMALY DETECTION FOR VEHICLE IN MOTION USING EXTERNAL VIEWS BY ESTABLISHED NETWORK AND CASCADING TECHNIQUES

(71) Applicant: INTERNATIONAL BUSINESS MACHINES CORPORATION, Armonk, NY (US)

(72) Inventors: Pradeep Venkata Sudindra Pusuluri, Visakhapatnam (IN); Sri Harsha Varada, Vizianagaram (IN); Venkata Vara Prasad Karri, Visakhapatnam (IN); Nagaraju Ampavalli, Visakhapatnam (IN)

(73) Assignee: International Business Machines Corporation, Armonk, NY (US)

( * ) Notice: Subject to any disclaimer, the term of this patent is extended or adjusted under 35 U.S.C. 154(b) by 406 days.

(21) Appl. No.: 17/355,683

(22) Filed: Jun. 23, 2021

(65) Prior Publication Data
US 2022/0415177 A1    Dec. 29, 2022

(51) Int. Cl.
*G08G 1/16*    (2006.01)
*B60K 35/00*    (2024.01)
(Continued)

(52) U.S. Cl.
CPC ............. *G08G 1/164* (2013.01); *B60K 35/00* (2013.01); *B60T 7/12* (2013.01); *G06F 18/2148* (2023.01);
(Continued)

(58) Field of Classification Search
CPC ...... G08G 1/164; G08G 1/0112; G08G 1/012; G08G 1/0129; G08G 1/0133;
(Continued)

(56) References Cited

U.S. PATENT DOCUMENTS 9,961,496 B2 * 5/2018 Ahmadzadeh ... G08G 1/096883
10,089,871 B2 * 10/2018 Lopez-Hinojosa ...... B60Q 9/00
(Continued)

FOREIGN PATENT DOCUMENTS

WO    2017098977 A1    6/2017

OTHER PUBLICATIONS

Disclosed Anonymously, "Contextually Augmented Accident Avoidance," IP.com, IP.com No. IPCOM000262090D, IP.com Publication Date: Apr. 30, 2020, 4 pages.
(Continued)

*Primary Examiner* — Tyler D Paige
(74) *Attorney, Agent, or Firm* — L. Jeffrey Kelly (57) ABSTRACT

According to one embodiment, a method, computer system, and computer program product for using mobile devices for anomaly detection in a vehicle. The present invention may include a computer receives sensor data from at least one mobile device associated with the vehicle, where the mobile device having one or more sensors. The computer analyzes data from the one or more sensors to identify an anomaly associated with the vehicle. The computer identifies a message associated with the anomaly. The computer determines an urgency value of the message based on the anomaly. The computer transfers the message with the urgency value to the vehicle and causes the vehicle to notify the message using a vehicle notification device.

20 Claims, 5 Drawing Sheets

(51) Int. Cl.
*B60T 7/12* (2006.01)
*G06F 18/214* (2023.01)
*G06F 18/25* (2023.01)
*G06V 20/59* (2022.01)
*B60K 35/28* (2024.01)
*G10L 15/18* (2013.01)
*G10L 15/26* (2006.01)

(52) U.S. Cl.
CPC ............ G06F 18/251 (2023.01); G06V 20/59 (2022.01); *B60K 35/28* (2024.01); *B60K 2360/178* (2024.01); *B60K 2360/21* (2024.01); *G10L 15/1822* (2013.01); *G10L 15/26* (2013.01)

(58) Field of Classification Search
CPC ............... G08G 1/0141; G08G 1/0145; G08G 1/096716; G08G 1/096725; G08G 1/096741; G08G 1/096775; G08G 1/205; B60K 35/00; B60K 2370/178; B60K 2370/21; B60K 2370/175; B60K 2370/573; B60K 2370/592; B60T 7/12; B60T 7/18; B60T 8/174; B60T 8/885; B60T 17/221; B60T 2270/408; G06F 18/2148; G06F 18/251; G06F 18/2433; G06V 20/59; G06V 20/54; G10L 15/1822; G10L 15/26; G07C 5/0825; G07C 5/0808; B60W 50/14

USPC .......................................................... 701/93
See application file for complete search history.

(56) References Cited

U.S. PATENT DOCUMENTS

| | | | |
|---|---|---|---|
| 2017/0366935 A1* | 12/2017 | Ahmadzadeh | .... H04M 1/72457 |
| 2019/0141069 A1* | 5/2019 | Pogorelik | ............ B60W 20/50 |
| 2020/0189577 A1 | 6/2020 | Penilla | |
| 2020/0211368 A1* | 7/2020 | Ueno | ................... G08G 1/0116 |
| 2021/0063578 A1* | 3/2021 | Wekel | ..................... G01S 7/481 |

OTHER PUBLICATIONS

Tian et al., "A Generalized Approach for Anomaly Detection From the Internet of Moving Things," IEEE Access, vol. 7, Published Oct. 2, 2019, pp. 144972-144982.

Mell et al., "The NIST Definition of Cloud Computing", National Institute of Standards and Technology, Special Publication 800-145, Sep. 2011, 7 pages.

* cited by examiner

ANOMALY DETECTION FOR VEHICLE IN MOTION USING EXTERNAL VIEWS BY ESTABLISHED NETWORK AND CASCADING TECHNIQUES

BACKGROUND

The present invention relates, generally, to the field of computing, and more particularly to vehicle anomaly detection and accident avoidance.

Big data typically applies to data sets whose size or type is beyond the ability of traditional relational databases to capture, manage and process with low latency. Analysis of big data allows analysts, researchers and business users to make better and faster decisions using data that was previously inaccessible or unusable. Businesses can use advanced analytics techniques, such as text analytics, machine learning, predictive analytics, data mining, statistics and natural language processing, to gain new insights from previously untapped data sources independently or together with existing enterprise data.

Mobile devices, internet of things (IoT) devices and wearable devices are smart electronic devices that incorporate micro-controllers that collect data and transfer the data over the internet to be utilized by a user. These devices may detect, analyze, and transmit data from the user surroundings, such as images, sound, location, speed and other data related to the user or the surrounding.

SUMMARY

According to one embodiment, a method, computer system, and computer program product for using mobile devices for anomaly detection in a vehicle. The present invention may include a computer receives sensor data from at least one mobile device associated with the vehicle, where the mobile device having one or more sensors. The computer analyzes data from the one or more sensors to identify an anomaly associated with the vehicle. The computer identifies a message associated with the anomaly. The computer determines an urgency value of the message based on the anomaly. The computer transfers the message with the urgency value to the vehicle and causes the vehicle to notify the message using a vehicle notification device.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate to the field of computing, and more particularly to vehicle anomaly detection and accident avoidance. The following described exemplary embodiments provide a system, method, and program product to, among other things, determine an anomaly related to a vehicle in motion and warning or taking proactive actions to resolve or remediate the detected anomaly. Therefore, the present embodiment has the capacity to improve the technical field of computerized accident avoidance and vehicle control based on data from plurality of sensors located in close proximity to the vehicle or along the rout the vehicle is driving.

As previously described, mobile devices are smart electronic devices that typically incorporate micro-controllers and sensors that may be used by a user. In addition, the mobile devices may be smart devices that are worn close to or on the surface of the skin. These devices may detect, analyze, and transmit sensor data over a wireless network. The data is typically related to the surrounding of the user such as video data, sound, location, speed and other data from sensors related to the user or the environment in the vicinity of the user.

Due to an increase in world population, more and more vehicles are required in order to enable a proper transportation for the increasing population. This fast growth in vehicle utilization can have negative implications, such as an increase in road accidents and mishaps. In addition, due to vehicle creating an enclosed space, there is a communication gap between the viewers of the vehicle from the outside and the driver and passengers from the inside of the vehicle. For example, a child may hang out of the window and get injured due to objects near the window while the vehicle passes by while the driver of the vehicle may not notice that this mishap occurs. In another example, a flat tire may be noticed by an outside bystander while the passenger cannot see it. As such, it may be advantageous to, among other things, implement a system that analyzes data from various sensors of wearable devices and other IoT devices located along the vehicle route and take affirmative actions and/or give recommendations to the driver of the vehicle when such dangerous conditions occur.

According to one embodiment, data from various sensors of wearable devices owned by bystanders and located near or in the vehicle may be received and, based on identifying anomaly related to the vehicle, corrective action may be taken and/or notify the driver accordingly. The sensors may be voice, video, acceleration and other recorders that may be utilized to identify an anomaly related to the vehicle. In addition, an urgency value associated with the anomaly may be determined and, based on the anomaly, it may either be disregarded, the vehicle stopped or an alert transmitted to the driver.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to identify an anomaly related to a vehicle and after determination of the urgency of the anomaly take an appropriate remediation steps, such as stop the vehicle or notify the driver or the passengers of the vehicle.

Figure 1:
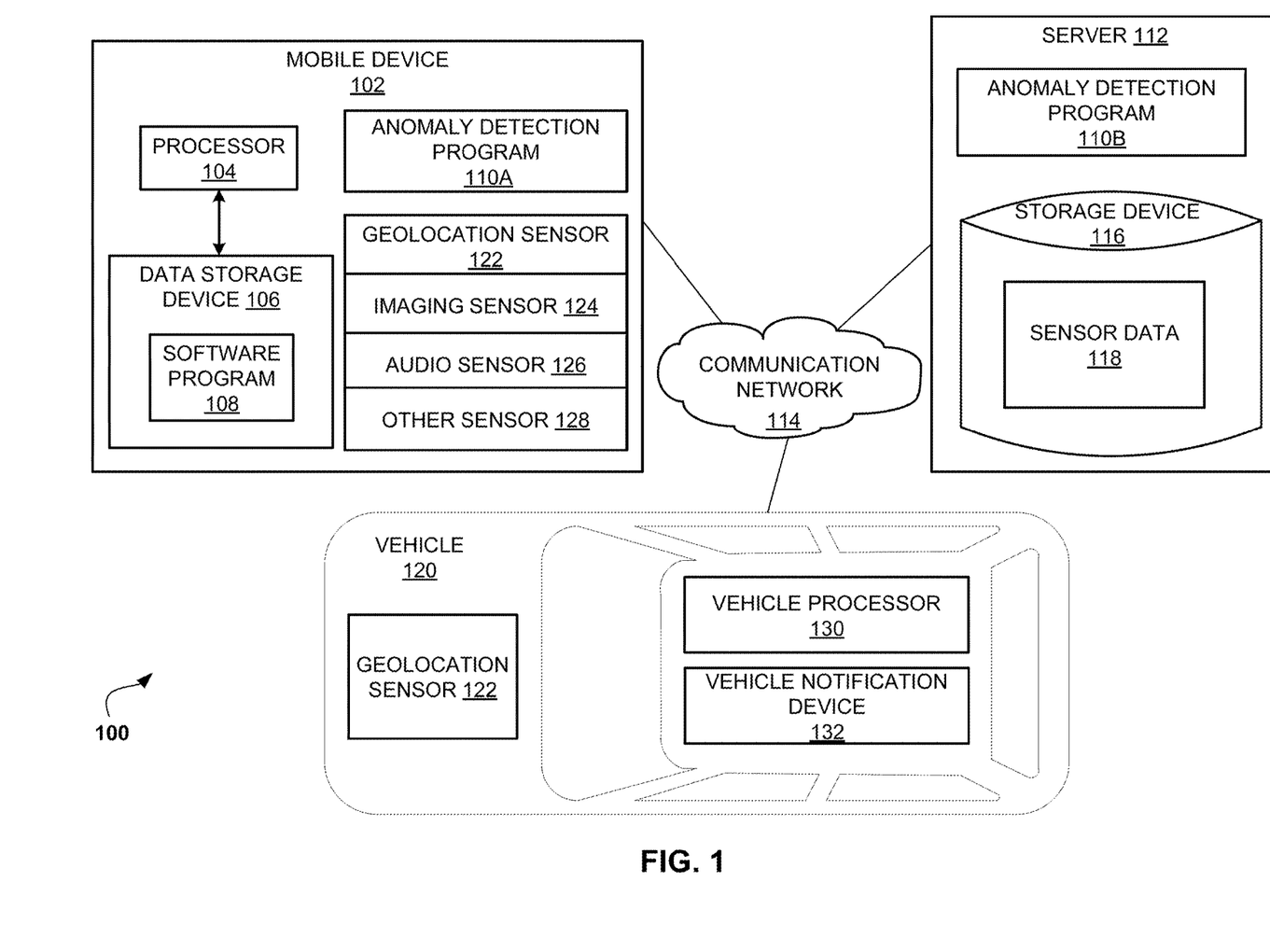
FIG. 1 illustrates an exemplary networked computer environment according to at least one embodiment.

Referring to FIG. 1, an exemplary networked computer environment 100 is depicted, according to at least one embodiment. The networked computer environment 100 may include mobile device 102, vehicle 110 and a server 112 interconnected via a communication network 114. According to at least one implementation, the networked computer environment 100 may include a plurality of mobile devices 102 and servers 112, of which only one of each is shown for illustrative brevity.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Mobile device 102 may include a processor 104, one or more sensors such as geolocation sensor 122, imaging sensor 124, audio sensor 126 and other sensors 128. In addition, the mobile device 102 has a data storage device 106 that is enabled to host and run a software program 108 and an anomaly detection program 110A and communicate with the server 112 via the communication network 114, in accordance with one embodiment of the invention. Mobile device 102 may be, for example, a mobile device, a smart watch, a smart glasses, a telephone, a personal digital assistant, a netbook, a laptop computer, a tablet computer, a desktop computer, a smart device such as IoT enabled device, a wearable device or any type of computing device that have one or more of the sensors and capable of running a program and accessing a network. As will be discussed with reference to FIG. 3, the mobile device 102 may include internal components 302a and external components 304a, respectively. Geolocation sensor 122 may be a Global Positioning Sensor (GPS), or any other sensors capable of identifying a geographic location. Imaging sensor 124 may be any sensor capable of taking images of the environment such as a photo camera sensor, a laser-based imaging sensor, an infra-red camera. Audio sensor 126 may be a microphone or any other device capable of recording sounds. Other sensors 128 may be any additional sensors available on the mobile device 102 such as an accelerometer, a thermometer, an ambient light sensor or any other available sensor that is used in a wearable or mobile smart device.

The server computer 112 may be a laptop computer, netbook computer, personal computer (PC), a desktop computer, or any programmable electronic device or any network of programmable electronic devices capable of hosting and running an anomaly detection program 110B and a storage device 116 that stores sensor data 118 received from sensors of mobile device 102 and communicating with the mobile device 102 via the communication network 114, in accordance with embodiments of the invention. As will be discussed with reference to FIG. 3, the server computer 112 may include internal components 302b and external components 304b, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

The vehicle 120 may be any type of vehicle used by a user in order to move from one location to another, such as a bus, a car, a scooter, or any other vehicle having a vehicle processor 130 and vehicle notification device 132 and connected to communication network 114. In another embodiment, vehicle 120 may incorporate a geolocation sensor 122. Vehicle processor 130 may be an electronic control unit (ECU) that is used to control the engine, steer and apply the brakes. According to an example embodiment, vehicle processor 130 may be similar to processor 104 and capable of giving instructions or commands to various systems of the vehicle such as steering and applying the brakes. In an alternative embodiment, although not shown if Figures, vehicle processor 130 may be capable of hosting and running an anomaly detection program 110A, 110B. Vehicle notification device 132 may be a screen, a monitor, a speaker or any other sensory (such as a vibrating device), video, or voice transmitting device located in the vehicle. In another embodiment, vehicle notification device 132 may be a speaker, monitor, vibration device or any type of visual, sensory or sound device that is capable of alerting the driver or one or more passenger of vehicle 120.

According to the present embodiment, the anomaly detection program 110A, 110B may be a program capable of collecting and analyzing data from mobile devices along the route or close to a geolocation of vehicle 120, identify anomalies by analyzing the data received from the sensors and take affirmative actions by transmitting commands to the vehicle or other users of the vehicle in order to avoid or remediate an accident. The vehicle anomaly detection and remediation method is explained in further detail below with respect to FIG. 2.

Figure 2:
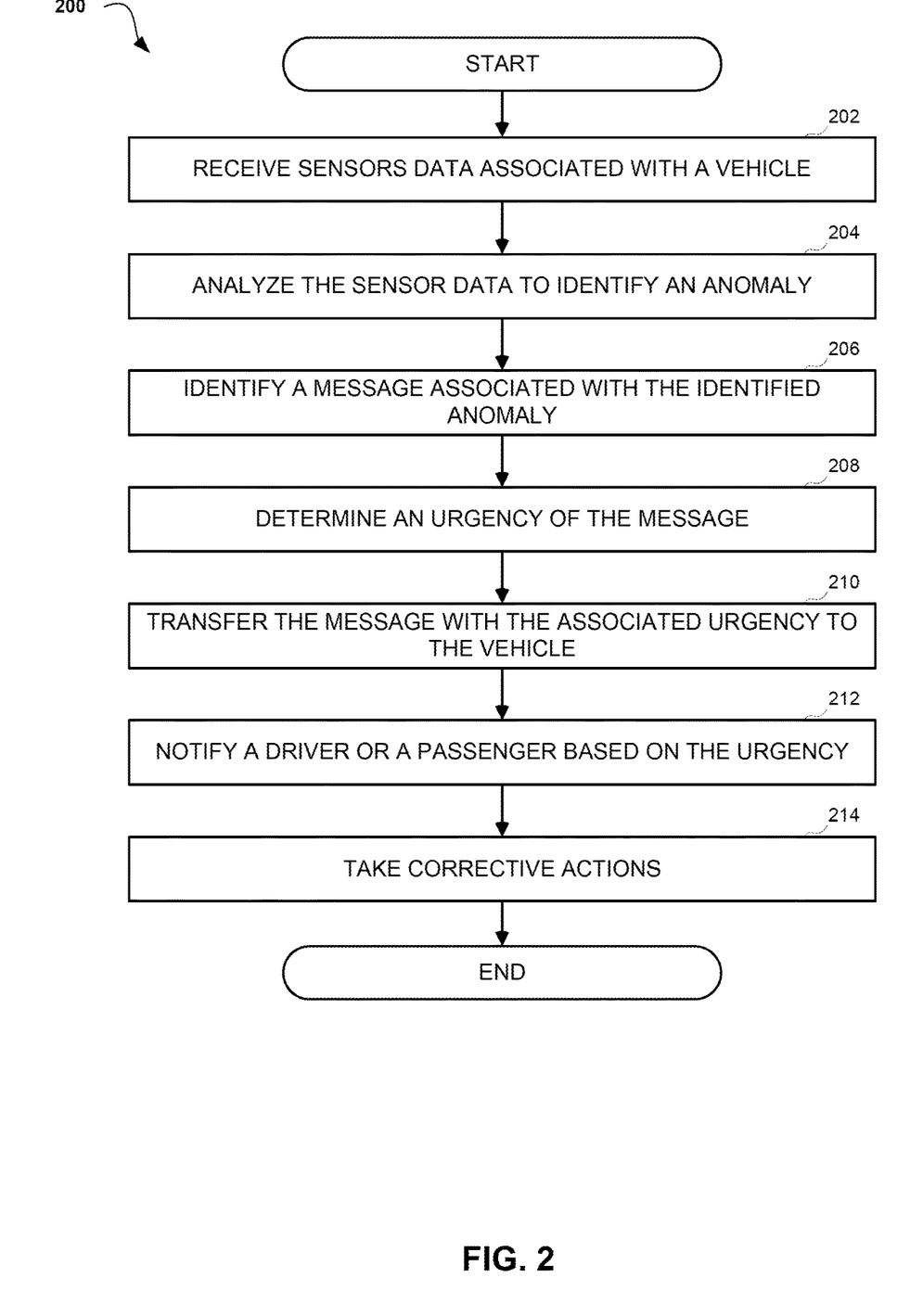
FIG. 2 is an operational flowchart illustrating a vehicle anomaly detection and remediation process according to at least one embodiment.

Referring now to FIG. 2, an operational flowchart illustrating a vehicle anomaly detection and remediation process 200 is depicted according to at least one embodiment. At 202, the anomaly detection program 110A, 110B receives sensor data associated with a vehicle. According to an example embodiment, the anomaly detection program 110A, 110B may accumulate all of the data from various sensors from a plurality of mobile and wearable devices in sensor data 118 held by bystanders or spectators. The sensor data 118 may be collected from mobile devices, wearable devices or other smart devices located in a predetermined distance from a driving vehicle 120. For example, all of the mobile devices located within the radius of 1000 feet may transmit their sensor data to server 112. Alternatively, the anomaly detection program 110A, 110B may filter the sensor data 118 to analyze only data related to the vehicle 120 using image recognition, and sensors located in a predetermine radius from the vehicle location that may be identified from the geolocation sensor 122 of the vehicle 120. In another embodiment, the anomaly detection program 110A, 110B may analyze the video or sound data to identify the vehicle using a machine learning algorithm. For example, the anomaly detection program 110A, 110B may use a trained neural network and optical character recognition techniques to extract information, such as license plate numbers, from the video data of sensor data 118 and identify the vehicle using license plate matching.

Next, at 204, the anomaly detection program 110A, 110B analyzes the sensor data to identify an anomaly. According to an example embodiment, the anomaly detection program 110A, 110B may analyze the video and sound data in order to identify an anomaly using a machine learning algorithm.

For example, the anomaly detection program 110A, 110B may apply a speech-to-text algorithm to convert all of the sound data such as conversations in various languages of spectators, passengers and other users that are close to the vehicle and then using natural language (NLP) processing identify a topic of the speech. For example, if several mobile devices record users talking in different languages and stating, for example, that a child pulled his hand out of the window, the anomaly detection program 110A, 110B may identify that text as a topic and due to its recurrence from different users and identify it as an anomaly related to the vehicle. The topic of the text may be identified using a trained deep neural network such as word embedding algorithm (Word2Vec). In another embodiment, the anomaly detection program 110A, 110B may use image processing coupled with trained neural network to identify an anomaly in video or an image from sensor data 118 related to the vehicle 120. For example, the anomaly detection program 110A, 110B may analyze a video of vehicle 120 and determine that the tire is damaged or that there is smoke emitting from the hood of the vehicle and thus identify this as an anomaly related to the vehicle 120. The identification that the tire is losing air pressure may be identified by image processing if, for example, the tire deviates from its previous size by a predetermined percentage, or by analyzing a voice recording from sensors having a special sound pattern associated with air escaping from a tire.

Then, at 206, the anomaly detection program 110A, 110B identifies a message associated with the identified anomaly. According to an example embodiment, the anomaly detection program 110A, 110B may utilize a bag of words or a word embedding (word2vec) algorithm to match the anomaly to a message that is related to the anomaly and may be displayed or pronounced using vehicle notification device 132. To continue the previous example, when the anomaly detection program 110A, 110B identifies that the tire of the vehicle is damaged, the anomaly detection program 110A, 110B may identify that this anomaly corresponds to a "flat tire" message.

Next, at 208, the anomaly detection program 110A, 110B determines an urgency of the message. According to an example embodiment, the anomaly detection program 110A, 110B may have a list that associates each message to an urgency value. The urgency value may be of any scale or a binary value. For example, an urgency value may be a Boolean value where 1 ("true") value represents that the message is urgent and 0 ("false") value represents that the message is not urgent. According to an example embodiment, the anomaly detection program 110A, 110B may assign an urgency value to each message according to a predefined table. In another embodiment, the anomaly detection program 110A, 110B may utilize a trained neural network that takes into account various factors, such as time, traffic conditions, number of users around the vehicle, vehicle size and weather conditions.

Then, at 210, the anomaly detection program 110A, 110B transfers the message with the associated urgency to the vehicle. According to an example embodiment, the anomaly detection program 110A, 110B may transfer the message with the urgency to vehicle processor 130 via communication network 114. In another embodiment, the anomaly detection program 110A, 110B may transfer the message to vehicle 120 using a volatile flash network connection through a mobile device that is in a proximity to vehicle 120.

Next, at 212, the anomaly detection program 110A, 110B notifies a driver or a passenger based on the urgency. According to an example embodiment, the anomaly detection program 110A, 110B may delay the message to the driver based on the urgency of the message. For example, if the message is not urgent, the anomaly detection program 110A, 110B may wait until the vehicle 120 stops before displaying the message on vehicle notification device 132. In another embodiment, the anomaly detection program 110A, 110B may delay the notification of the message for a timeframe determined by the urgency value or a number of messages received in a time frame predetermined by a user. For example, if the vehicle 120 receives more than 5 messages within one minute, and all of the messages are urgent, the anomaly detection program 110A, 110B may instruct the vehicle processor 130 to display only the first message and, only after the predetermined time frame, notify the driver with the second message etc.

Then, at 214, the anomaly detection program 110A, 110B takes corrective actions. According to an example embodiment, when the urgency value represents that the message is urgent, the anomaly detection program 110A, 110B may send an instruction to vehicle processor 130 to take a corrective action. For example, when the message is "flat tire" and the message is urgent, the anomaly detection program 110A, 110B may send an instruction to the vehicle processor 130 to stop vehicle 120. In another embodiment, the anomaly detection program 110A, 110B may wait a predetermined timeframe after the driver was notified and only when the driver fails to act transmit the instruction to control or stop the vehicle 120. In further embodiment, the anomaly detection program 110A, 110B may instruct the vehicle processor 130 to stop at a safe location by identifying current location and speed of the vehicle and using a map to instruct the vehicle 120 via vehicle processor 130 to move to a safe location before stopping.

It may be appreciated that FIG. 2 provides only an illustration of one implementation and does not imply any limitations with regard to how different embodiments may be implemented. Many modifications to the depicted environments may be made based on design and implementation requirements.

Figure 3:
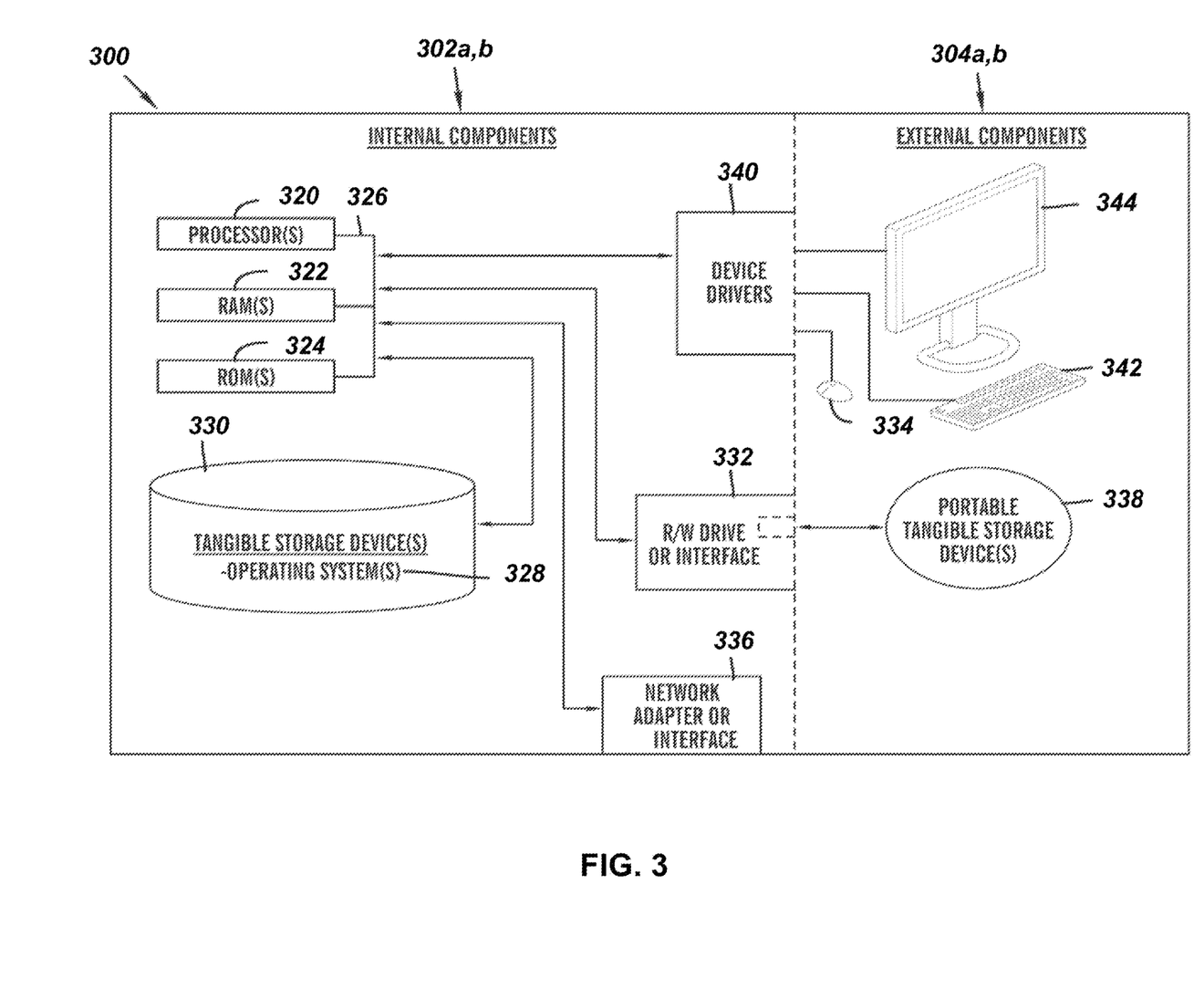
FIG. 3 is a block diagram of internal and external components of computers and servers depicted in FIG. 1 according to at least one embodiment.

FIG. 3 is a block diagram 300 of internal and external components of the mobile device 102 and the server 112 depicted in FIG. 1 in accordance with an embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

The data processing system 302, 304 is representative of any electronic device capable of executing machine-readable program instructions. The data processing system 302, 304 may be representative of a smart phone, a computer system, PDA, or other electronic devices. Examples of computing systems, environments, and/or configurations that may represented by the data processing system 302, 304 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The mobile device 102 and the server 112 may include respective sets of internal components 302 a,b and external components 304 a,b illustrated in FIG. 3. Each of the sets of internal components 302 include one or more processors 320, one or more computer-readable RAMs 322, and one or more computer-readable ROMs 324 on one or more buses 326, and one or more operating systems 328 and one or more computer-readable tangible storage devices 330. The one or more operating systems 328, the software program 108 and the anomaly detection program 110A in the mobile device 102, and the anomaly detection program 110B in the server 112 are stored on one or more of the respective computer-readable tangible storage devices 330 for execution by one or more of the respective processors 320 via one or more of the respective RAMs 322 (which typically include cache memory). In the embodiment illustrated in FIG. 3, each of the computer-readable tangible storage devices 330 is a magnetic disk storage device of an internal hard drive. Alternatively, each of the computer-readable tangible storage devices 330 is a semiconductor storage device such as ROM 324, EPROM, flash memory or any other computer-readable tangible storage device that can store a computer program and digital information.

Each set of internal components 302 a,b also includes a R/W drive or interface 332 to read from and write to one or more portable computer-readable tangible storage devices 338 such as a CD-ROM, DVD, memory stick, magnetic tape, magnetic disk, optical disk or semiconductor storage device. A software program, such as the anomaly detection program 110A, 110B, can be stored on one or more of the respective portable computer-readable tangible storage devices 338, read via the respective R/W drive or interface 332, and loaded into the respective hard drive 330.

Each set of internal components 302 a,b also includes network adapters or interfaces 336 such as a TCP/IP adapter cards, wireless Wi-Fi interface cards, or 3G or 4G wireless interface cards or other wired or wireless communication links. The software program 108 and the anomaly detection program 110A in the mobile device 102 and the anomaly detection program 110B in the server 112 can be downloaded to the mobile device 102 and the server 112 from an external computer via a network (for example, the Internet, a local area network or other, wide area network) and respective network adapters or interfaces 336. From the network adapters or interfaces 336, the software program 108 and the anomaly detection program 110A in the mobile device 102 and the anomaly detection program 110B in the server 112 are loaded into the respective hard drive 330. The network may comprise copper wires, optical fibers, wireless transmission, routers, firewalls, switches, gateway computers and/or edge servers.

Each of the sets of external components 304 a,b can include a computer display monitor 344, a keyboard 342, and a computer mouse 334. Although not depicted, in smart devices, a computer display monitor 344, a keyboard 342, and a computer mouse 334 may be incorporated into the screen or a smart glass. External components 304 a,b can also include touch screens, virtual keyboards, touch pads, pointing devices, and other human interface devices. Each of the sets of internal components 302 a,b also includes device drivers 340 to interface to computer display monitor 344, keyboard 342, and computer mouse 334. The device drivers 340, R/W drive or interface 332, and network adapter or interface 336 comprise hardware and software (stored in storage device 330 and/or ROM 324).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
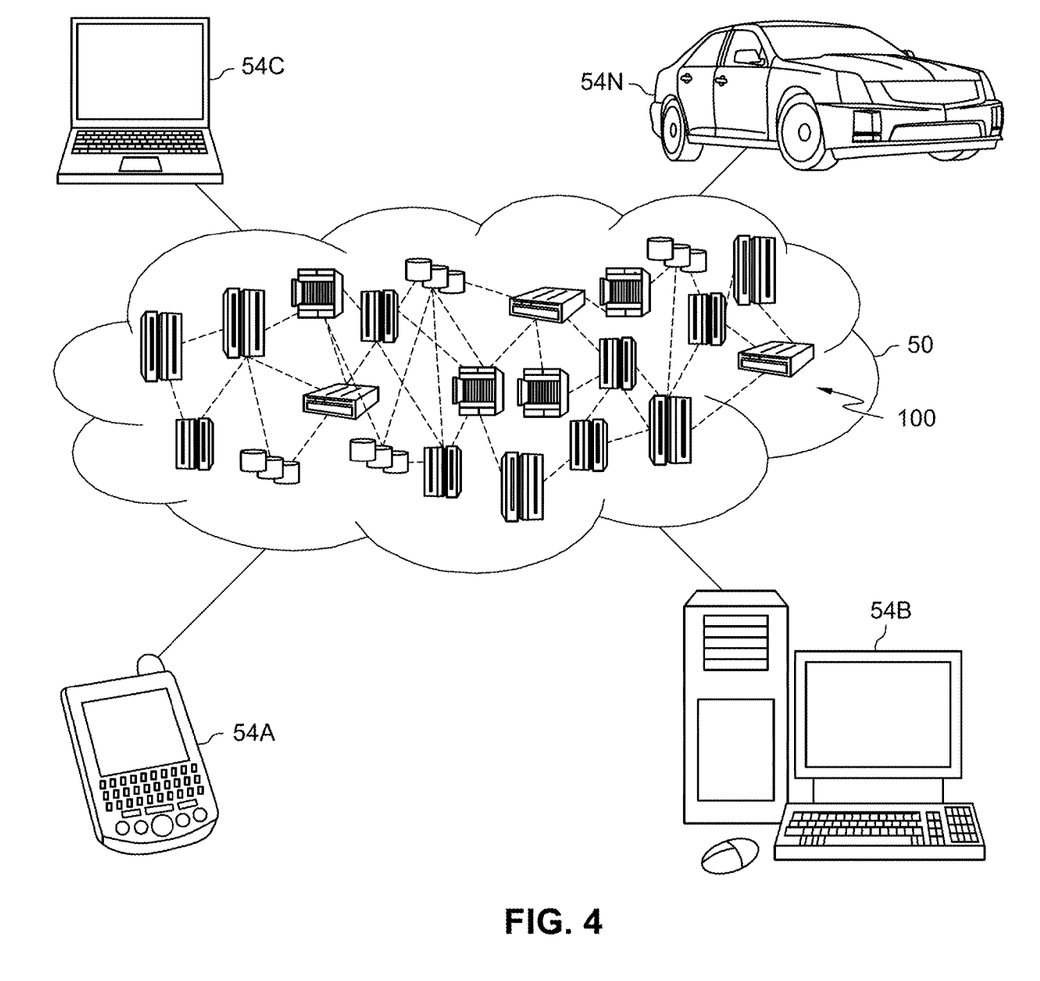
FIG. 4 depicts a cloud computing environment according to an embodiment of the present invention.

Referring now to FIG. 4, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 100 and cloud computing environment 50 can communicate with any type of computerized device over any type of network and/or network addressable connection (e.g., using a web browser).

Figure 5:
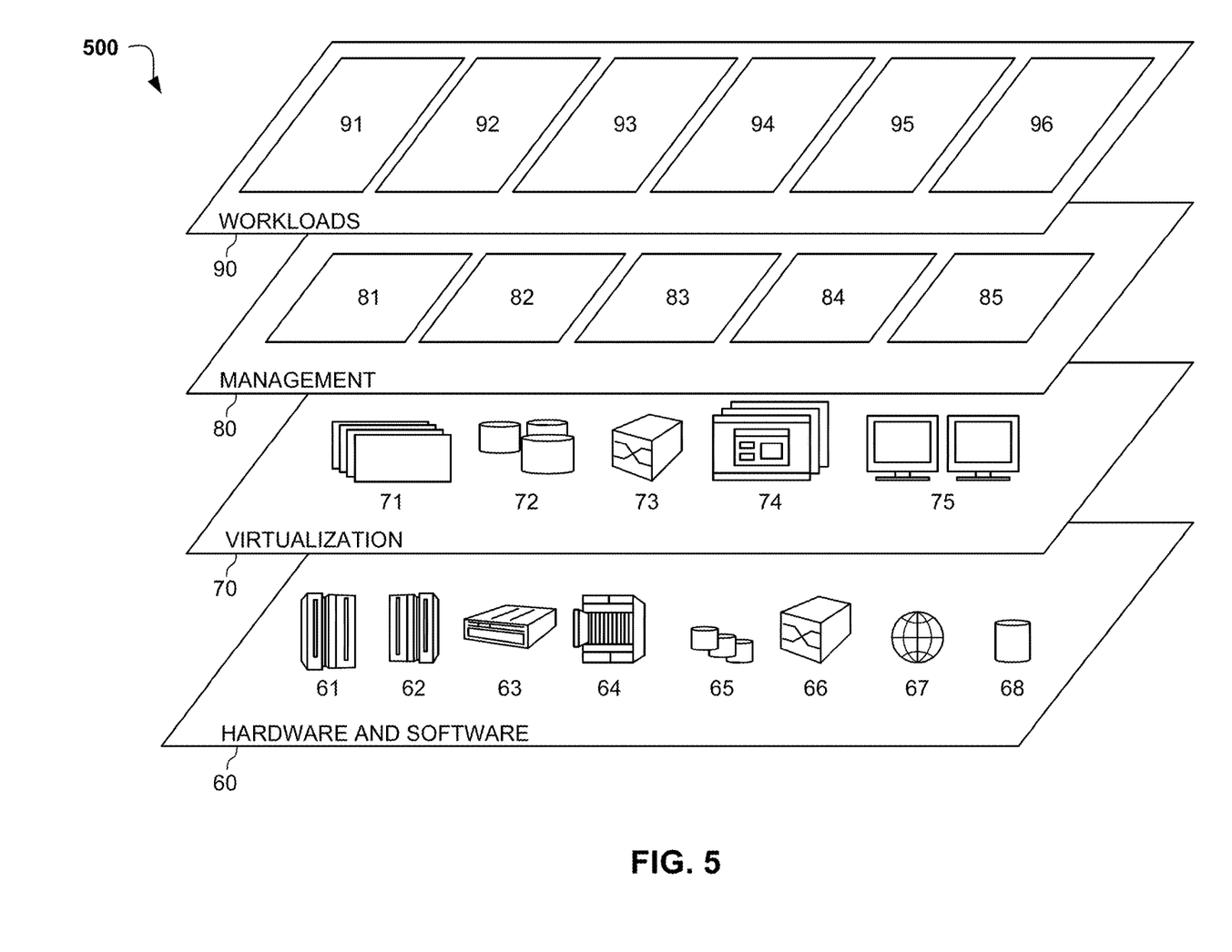
FIG. 5 depicts abstraction model layers according to an embodiment of the present invention.

Referring now to FIG. 5, a set of functional abstraction layers 500 provided by cloud computing environment 50 is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and vehicle anomaly detection 96. Vehicle anomaly detection 96 may relate to analyzing received sensor data from mobile devices located near the vehicle and based on identifying an anomaly transmitting corrective actions to the vehicle.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for using mobile devices for anomaly detection in a vehicle, the method comprising:

receiving sensor data from a plurality of mobile devices and wearable devices, wherein the plurality of mobile devices and wearable devices are located within a predetermined distance of the vehicle;

analyzing the sensor data to identify an anomaly related to a physical condition of the vehicle;

identifying a vehicle status message related to the identified anomaly from a list of vehicle status messages;

assigning an urgency value to each message according to a predefined table;

transferring the message and the urgency value to the vehicle;

causing the vehicle to notify a driver of the vehicle by displaying or pronouncing the message using a vehicle notification device; and causing the vehicle to stop based on the transferred message.

2. The method of claim 1, wherein causing the vehicle to stop is further based on the urgency value assigned to the message.

3. The method of claim 1, wherein the sensor data comprises video data and sound data, and wherein analyzing the sensor data comprises using a trained neural network to analyze the video data and the sound data.

4. The method of claim 1, wherein transferring the message and the urgency value to the vehicle is performed via a volatile flash network connection.

5. The method of claim 1, wherein the vehicle notification device is a monitor in the vehicle.

6. The method of claim 1, wherein the vehicle notification device comprises a vibration device located in the vehicle.

7. The method of claim 1, wherein analyzing the sensor data further comprises:
- converting sound data to text using a speech-to-text algorithm;
- determining a topic of the text using natural language processing; and
- identifying the anomaly based on the topic of the text.

8. A processor-implemented method for using mobile devices for anomaly detection in a vehicle, the method comprising:
- receiving sensor data from a plurality of mobile devices and wearable devices, wherein the plurality of mobile devices and wearable devices are located within a predetermined distance of the vehicle;
- analyzing the sensor data to identify an anomaly related to a physical condition of the vehicle;
- identifying a vehicle status message related to the identified anomaly from a list of vehicle status messages;
- assigning an urgency value to each message according to a predefined table;
- transferring the message and the urgency value to the vehicle;
- based on the urgency value assigned to the message, causing the vehicle to notify a driver of the vehicle by displaying or pronouncing the message using a vehicle notification device; and
- causing the vehicle to stop based on the transferred message.

9. The method of claim 8, wherein causing the vehicle to stop is further based on the urgency value assigned to the message.

10. The method of claim 8, wherein the sensor data comprises video data and sound data, and wherein analyzing the sensor data comprises using a trained neural network to analyze the video data and the sound data.

11. The method of claim 8, wherein transferring the message and the urgency value to the vehicle is performed via a volatile flash network connection.

12. The method of claim 8, wherein the vehicle notification device is a monitor in the vehicle.

13. The method of claim 8, wherein the vehicle notification device comprises a vibration device located in the vehicle.

14. The method of claim 8, wherein analyzing the sensor data further comprises:
- converting sound data to text using a speech-to-text algorithm;
- determining a topic of the text using natural language processing; and
- identifying the anomaly based on the topic of the text.

15. A processor-implemented method for using mobile devices for anomaly detection in a vehicle, the method comprising:
- receiving sensor data from a plurality of mobile devices and wearable devices, wherein the plurality of mobile devices and wearable devices are located within a predetermined distance of the vehicle;
- analyzing the sensor data to identify an anomaly related to a physical condition of the vehicle;
- identifying a vehicle status message related to the identified anomaly from a list of vehicle status messages;
- assigning an urgency value to each message according to a predefined table;
- transferring the message and the urgency value to the vehicle;
- based on the urgency value assigned to the message, causing the vehicle to notify a driver of the vehicle by displaying or pronouncing the message using a vehicle notification device; and
- causing the vehicle to stop based on the transferred message.

16. The method of claim 15, wherein causing the vehicle to stop is further based on the urgency value assigned to the message.

17. The method of claim 15, wherein the sensor data comprises video data and sound data, and wherein analyzing the sensor data comprises using a trained neural network to analyze the video data and the sound data.

18. The method of claim 15, wherein transferring the message and the urgency value to the vehicle is performed via a volatile flash network connection.

19. The method of claim 15, wherein the vehicle notification device comprises a vibration device located in the vehicle.

20. The method of claim 15, wherein analyzing the sensor data further comprises:
- converting sound data to text using a speech-to-text algorithm;
- determining a topic of the text using natural language processing; and
- identifying the anomaly based on the topic of the text.

* * * * *